United States Patent
Fleegal et al.

(10) Patent No.: US 8,601,184 B2
(45) Date of Patent: *Dec. 3, 2013

(54) UPDATING IMAGE IN BUFFER VIA DIFFERENCE DATA

(71) Applicants: Eric Fleegal, Bothell, WA (US); Chris Whitman, Fort Collins, CO (US); Xianfeng Tian, Sammamish, WA (US); Amar S. Vattakandy, Longmont, CO (US); Jim Belesiu, Mill Creek, WA (US); Robert D. Young, Kirkland, WA (US)

(72) Inventors: Eric Fleegal, Bothell, WA (US); Chris Whitman, Fort Collins, CO (US); Xianfeng Tian, Sammamish, WA (US); Amar S. Vattakandy, Longmont, CO (US); Jim Belesiu, Mill Creek, WA (US); Robert D. Young, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,851

(22) Filed: Dec. 26, 2012

(65) Prior Publication Data

US 2013/0106884 A1    May 2, 2013

Related U.S. Application Data

(63) Continuation of application No. 12/892,666, filed on Sep. 28, 2010, now Pat. No. 8,364,865.

(51) Int. Cl.
*G06F 17/00* (2006.01)
*H04N 7/12* (2006.01)
*H04B 1/66* (2006.01)
*G06F 3/00* (2006.01)

(52) U.S. Cl.
USPC ........... 710/52; 345/418; 348/400.1; 375/240

(58) Field of Classification Search
None
See application file for complete search history.

(56) References Cited

U.S. PATENT DOCUMENTS

| | | | |
|---|---|---|---|
| 5,086,480 A | 2/1992 | Sexton | |
| 5,818,361 A | 10/1998 | Acevedo | |
| 6,100,941 A | 8/2000 | Dimitrova et al. | |
| 6,760,061 B1 | 7/2004 | Glier et al. | |
| 7,116,283 B2 * | 10/2006 | Benson et al. | 345/1.1 |
| 7,420,616 B2 | 9/2008 | Linzer et al. | |
| 2007/0098282 A1 | 5/2007 | Kubota et al. | |
| 2009/0080523 A1 | 3/2009 | McDowell | |

(Continued)

OTHER PUBLICATIONS

Li, et al., "What You See is What I Saw: Applications of Stateless Client Systems in Asynchronous CSCW", Retrieved at <<http://citeseerx.ist.psu.edu/viewdoc/download?doi=10.1.1.98.5208&rep=rep1&type=pdf>>, The Fourth International Conference on Computer Science and Informatics, Oct. 1998, pp. 5.

(Continued)

*Primary Examiner* — Chun-Kuan Lee
*Assistant Examiner* — Richard B Franklin
(74) *Attorney, Agent, or Firm* — Alleman Hall McCoy Russell & Tuttle LLP

(57) ABSTRACT

Various embodiments related to a host computing device for rendering and sending image data to a peripheral device for display at the peripheral device. For example, one embodiment comprises a host computing device, the host computing device comprising a data storage subsystem and a logic subsystem. The host computing device further comprises instructions stored in the data storage subsystem and executable by the logic subsystem to output to the peripheral device a frame of image data representing a difference between a currently rendered image and an (N−1)-th previously rendered image, N being an integer and having a value of 3 or more.

20 Claims, 10 Drawing Sheets

(56) References Cited

U.S. PATENT DOCUMENTS

| | | |
|---|---|---|
| 2009/0097751 A1 | 4/2009 | McDowell |
| 2009/0196516 A1 | 8/2009 | Perlman et al. |
| 2010/0013843 A1 | 1/2010 | Ameline |
| 2010/0232518 A1 | 9/2010 | Coleman, Sr. |

OTHER PUBLICATIONS

Warnock, John E. "A Hidden Surface Algorithm for Computer Generated Halftone Pictures," Technical Report, University of Utah, Jun. 1969, 34 pages.

* cited by examiner

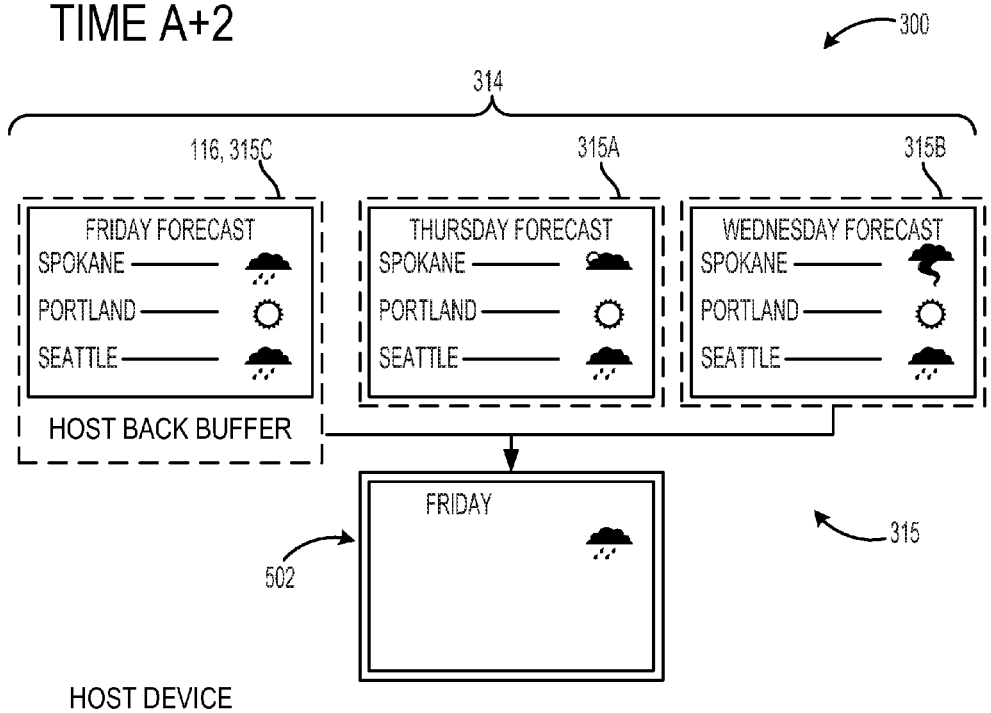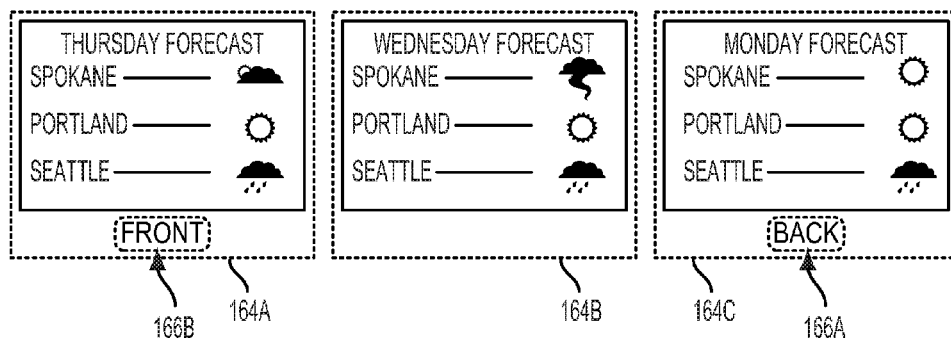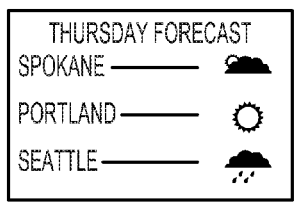
FIG. 5

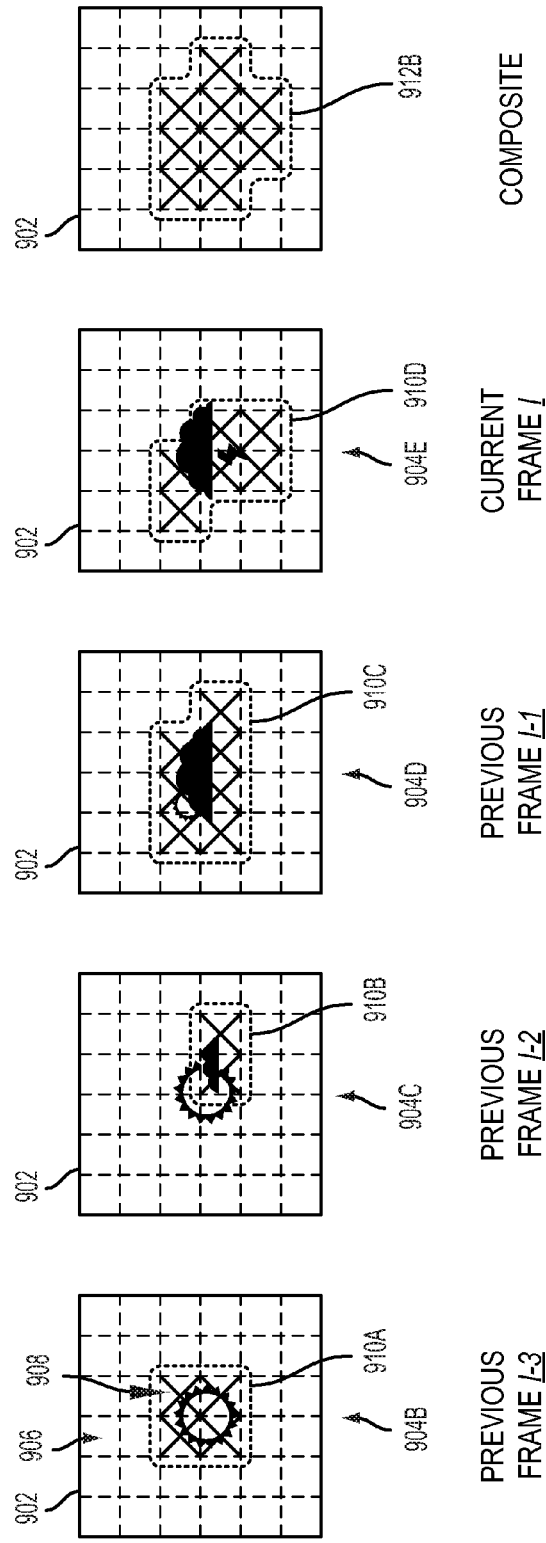

UPDATING IMAGE IN BUFFER VIA DIFFERENCE DATA

CROSS-REFERENCE TO RELATED APPLICATIONS

This application is a continuation of U.S. patent application Ser. No. 12/892,666, titled MULTIPLE IMAGE BUFFER SIMULATION and filed Sep. 28, 2010, the entire disclosure of which is hereby incorporated by reference.

BACKGROUND

Computing devices may be connected to various peripheral devices, which may display images provided by the computing device via the connection. Because some connections may be bandwidth limited, image presentation at the peripheral device may be slow or jittery, creating an unpleasant viewing experience.

In some prior approaches to speed up image presentation, the computing device sends, on a frame-by-frame basis, changes made to the image frame to the peripheral device to reduce bandwidth consumption and speed image display. The remaining portions of the image are filled out by image data sent by the computing device at an earlier time. However, because the peripheral device computing resources may be limited in comparison to the resources of the computing device, the image assembly process at the peripheral device may also slow image display.

SUMMARY

Various embodiments are disclosed herein that relate to a host computing device for rendering and sending image data to a peripheral device for display at the peripheral device. For example, one embodiment comprises a host computing device, the host computing device comprising a data storage subsystem and a logic subsystem. The host computing device further comprises instructions stored in the data storage subsystem and executable by the logic subsystem to output to the peripheral device a frame of image data representing a difference between a currently rendered image and an (N−1)-th previously rendered image, N being an integer and having a value of 3 or more.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a schematic view of an operational state at the example image display system of FIG. 4 at a time (A+2) according to an embodiment of the method depicted in FIG. 2.

FIG. 10 is a schematic view of a changed tile composite generated according to an embodiment of the present disclosure.

DETAILED DESCRIPTION

Peripheral devices, such as keyboards, mice, and tablets, may include display units for presenting images provided by a host computing device. For example, a keyboard may include a display screen that presents images received from a host PC. The screen may display functional images, such as a keyboard layout, or aesthetic images, such as a peripheral device skin. The host computing device may send image updates so that the images displayed by the peripheral device are refreshed or changed over time.

For example, the peripheral device may receive image data from the host computing device on a frame-by-frame basis. Because images may be updated frequently, the host computing device may send a difference between sequential images instead of the images themselves to save bandwidth. To accomplish this, the host computing device may subtract the two sequential frames and send the subtraction result to the peripheral device. The peripheral device receives the subtraction result and adds it to image data stored at the peripheral device, generating an updated image.

However, because the subtraction result is only a portion of the updated image, the peripheral device must provide the balance of the image data. Conventionally, the peripheral device copies the balance of the image data from another image buffer. This "forward copying" may cause the peripheral device to block the receipt of future subtraction results from the host until the forward copying is complete. Consequently, forward copying may slow or freeze image transmission and display at the peripheral device.

Accordingly, embodiments are described herein that are directed at eliminating forward copying at the peripheral device. Rather than transmit sequential subtraction results on a frame-by-frame basis, the embodiments described herein transmit a frame of image data comprising a difference between a current frame and at least the previous (N−1) frames, where N is an integer of 3 or more and where N is equal to or greater than a number of peripheral device buffers. Thus, where N=3, the host computing device transmits a difference between the current frame and an image positioned two frames prior in the frame sequence. In some embodiments, the frame of image data may comprise all of the differences between the currently rendered image and the (N−1)-th previously rendered image.

Figure 1:
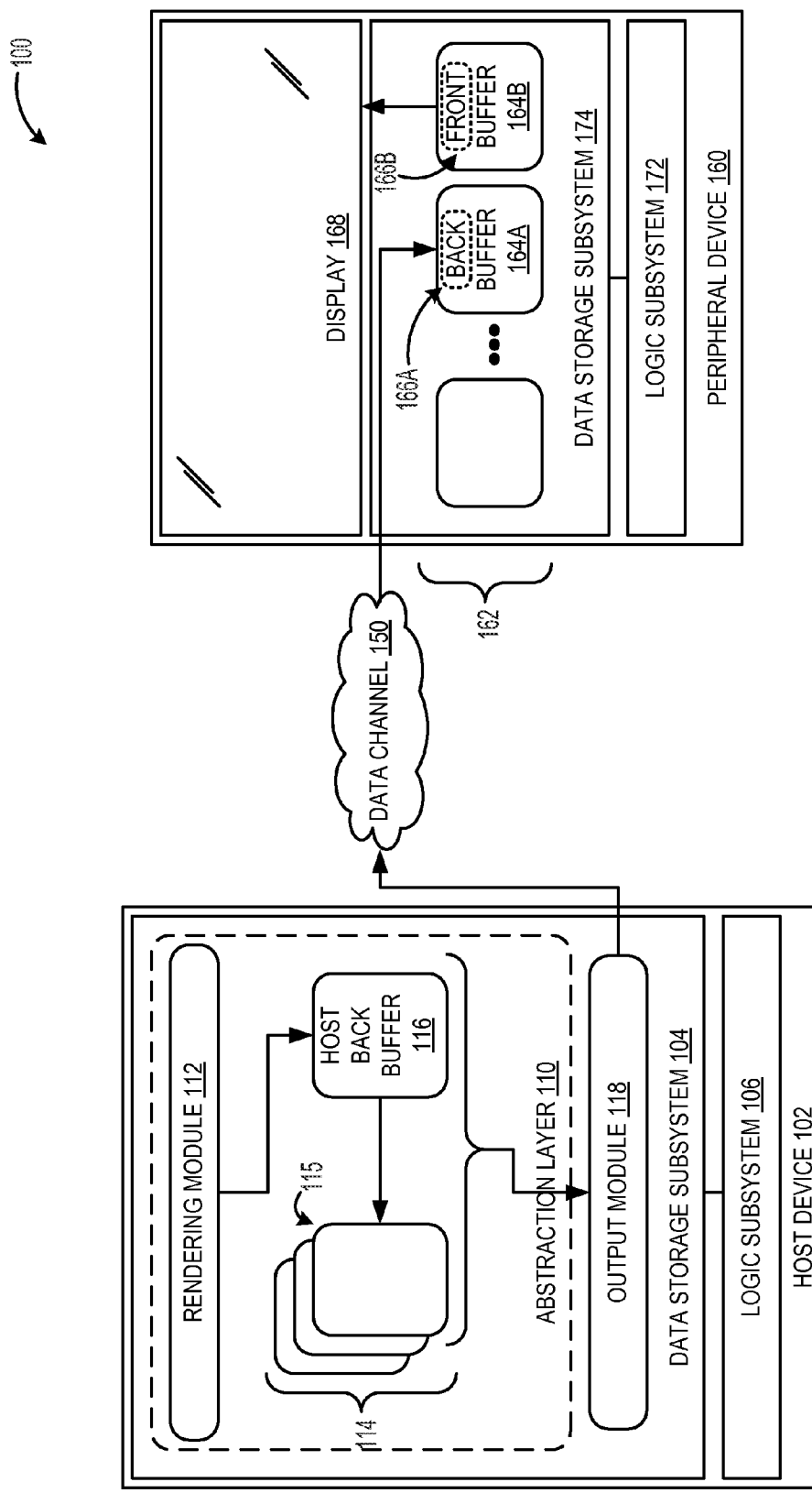
FIG. 1 is a schematic view of an image display system according to an embodiment of the present disclosure.

FIG. 1 shows an embodiment of an image display system 100. As shown in FIG. 1, image display system 100 includes a host computing device 102 and a peripheral device 160. Host computing device 102 is depicted as being connected to peripheral device 160 via data channel 150. Data channel 150 may include a wired and/or a wireless data channel. Examples of data channel 150 include, but are not limited to, USB channels, Bluetooth channels, and 802.11x channels.

Host computing device 102 includes a data storage subsystem 104 for holding instructions executed by logic subsystem 106. Similarly, peripheral device 160 includes a data storage subsystem 174 for holding instructions executed by logic subsystem 172. Data storage subsystems 104 and 162 may include one or more mass storage devices, such as a hard disk and/or nonvolatile flash memory, and one or more volatile memory devices. Logic subsystems 172 may include one or more processors, such as a CPU and/or a GPU. Thus, it will be appreciated that both host computing device 102 and peripheral device 160 may be computing devices. Examples of host computing device 102 include, but are not limited to, personal computers, mobile computers, wireless computing devices, and servers operating in a cloud environment. Examples of peripheral device 160 include multifunctional peripheral devices, keyboards, mice, and tablets.

In the embodiment depicted in FIG. 1, host computing device 102 includes a rendering module 112 and an output module 118. Rendering module 112 generates an image for display based on image data received from an image source, such as a graphics engine running on host computing device 102 (not shown). For example, rendering module 112 may generate a grid of pixel data based on raster image data received from a graphics engine.

The rendered image is stored in host back buffer 116, from which a frame of image data is output to peripheral device 160 by output module 118. In some embodiments, output module 118 may comprise a frame buffer configured to push a frame of image data from host back buffer 116 to peripheral device 160. Alternatively, output module 118 may be configured as a host front buffer, storing a frame of image data which is pulled from output module 118 by peripheral device 160.

As explained above, the frame of image data sent from host computing device 102 also includes a difference between the image stored in host back buffer 116 and an (N−1)-th previously sent image. Host computing device 102 identifies the difference, storing the difference in a host image data storage chain 114.

Host image data storage chain 114 simulates a buffer chain of peripheral device 160. Simulating the peripheral device buffer chain eliminates forward copying at peripheral device 160. This potentially allows image display system 100 to free computational resources at peripheral device 160 and improve image transfer and display speeds.

Host image data storage chain 114 includes at least N host image data storage elements 115, N being an integer and having a value of 3 or more. The value of N is selected so that the number of host image data storage elements 115 matches or exceeds the number of peripheral device buffers 164. Thus, host image data storage chain 114 may be used to accumulate one or more differences within the N host image storage elements 115, simulating the image data stored in a peripheral device buffer chain 162 at peripheral device 160.

In some embodiments, host back buffer 116 may be included in host image data storage chain 114 as one of the N host image data storage elements 115, forming a host image buffer chain. In some other embodiments, host image data storage chain 114 may comprise N lists of differences, such as N lists of change regions or N lists of changed tiles, wherein each host image data storage element 115 includes a corresponding frame difference.

In some embodiments, host back buffer 116 and output module 118 may be included in optional abstraction layer 110. Abstraction layer 110 may be partitioned into additional storage elements for holding image data. Thus, abstraction layer 110 may provide a convenient structure for grouping functionality within host computing device 102. However, it will be appreciated that abstraction layer 110 is optional and that the benefits of the present disclosure may be realized without it.

As introduced above, peripheral device 160 includes a peripheral device buffer chain 162 that stores received images in a plurality of peripheral device buffers 164. Peripheral device buffer chain 162 is a continuous, closed buffer chain having N peripheral device buffers 164.

Once received at peripheral device 160, a frame of image data is stored in each peripheral device buffer 164 until overwritten by an incoming frame of image data. In the embodiments described herein, frames of image data are received at a peripheral device back buffer and displayed from a peripheral device front buffer. However, it will be appreciated that other suitable buffering scenarios may be employed within the scope of the present disclosure.

In the embodiment shown in FIG. 1, peripheral device buffer chain 162 includes two buffer pointers 166. Buffer pointers 166 indicate which of peripheral device buffers 164 is the peripheral device back buffer and which of peripheral device buffers 164 is the peripheral device front buffer.

Buffer pointers 166 are advanced as each image is received. For example, as shown in FIG. 1, buffer pointer 166A indicates that peripheral device buffer 164A is the peripheral device back buffer. Similarly, buffer pointer 166B indicates that peripheral device buffer 164B is the peripheral device front buffer. When the next frame of image data is received by peripheral device 160 and buffer pointers 166 are advanced, the current image will be indicated as stored in the peripheral device front buffer and will be displayed at display 168.

As explained above, the difference included in the frame of image data represents a difference between the instant image and an (N−1)-th prior frame, where N is an integer of three or greater. Thus, in one scenario, the difference included in the frame of image data may be a difference between the instant image and an image rendered two frames prior to the instant image (e.g., where N=3). Because the peripheral device back buffer already contains the portions of the image that are not different, the peripheral device may only update the peripheral device back buffer with the difference data. Thus, a forward copy from the previous peripheral device back buffer is redundant and may be eliminated.

For example, a frame of image data sent to peripheral device 160 may include pixel information for the image and one or more differences between the instant frame and a prior frame. In some embodiments, the difference may be represented by pixel data. In some other embodiments, the difference may be represented by coordinates for a change region. In still other embodiments, the difference may be represented by identifiers for a changed tile.

Figure 2:
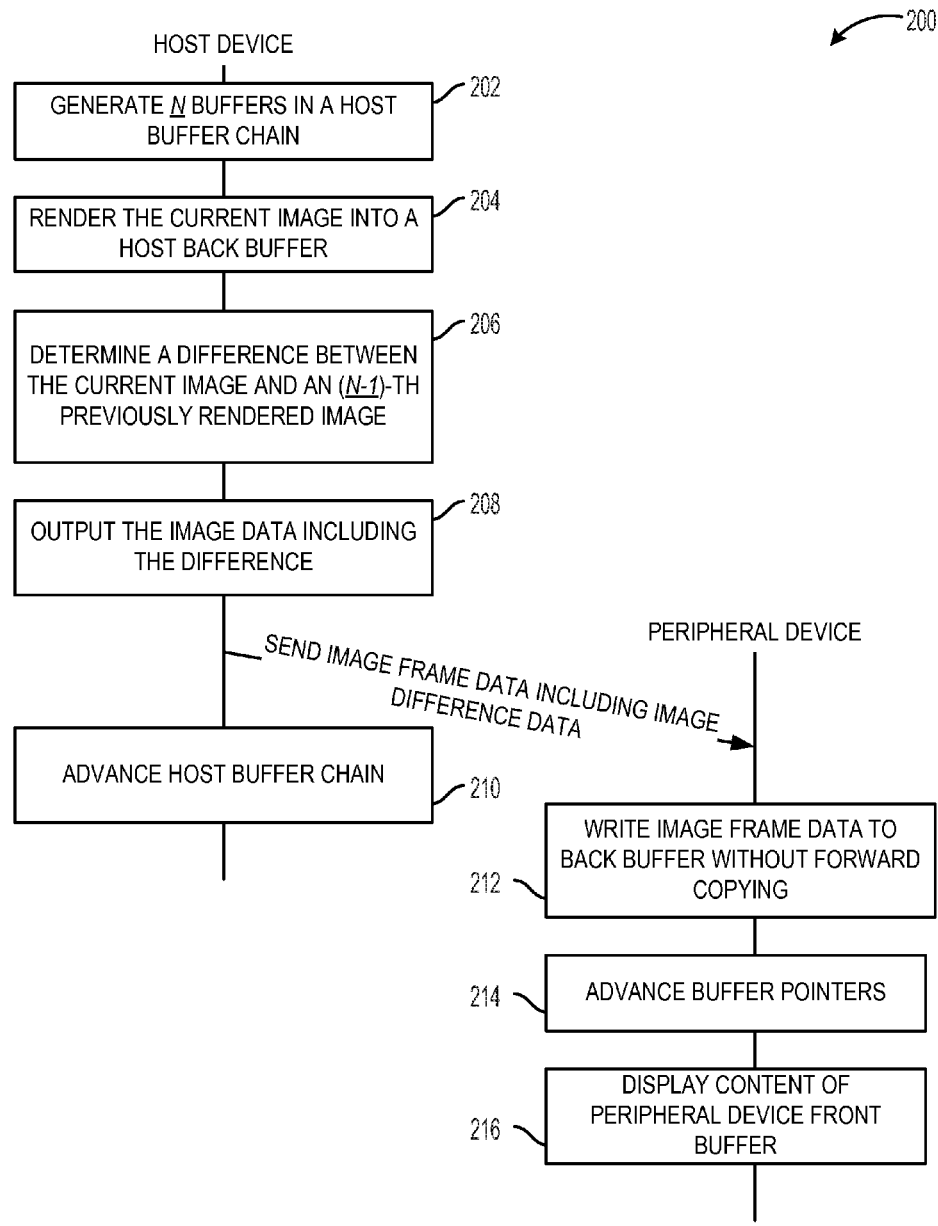
FIG. 2 is a flowchart depicting a method of sending image data from a host computing device to a peripheral device for display at the peripheral device according to an embodiment of the present disclosure.

FIG. 2 illustrates a flowchart showing an embodiment of a method 200 for generating and sending a frame of image data from a host computing device to a peripheral device for display at the peripheral device. It will be appreciated that method 200 may be performed by any suitable image display system and is not limited to the embodiments described herein.

Figure 3:
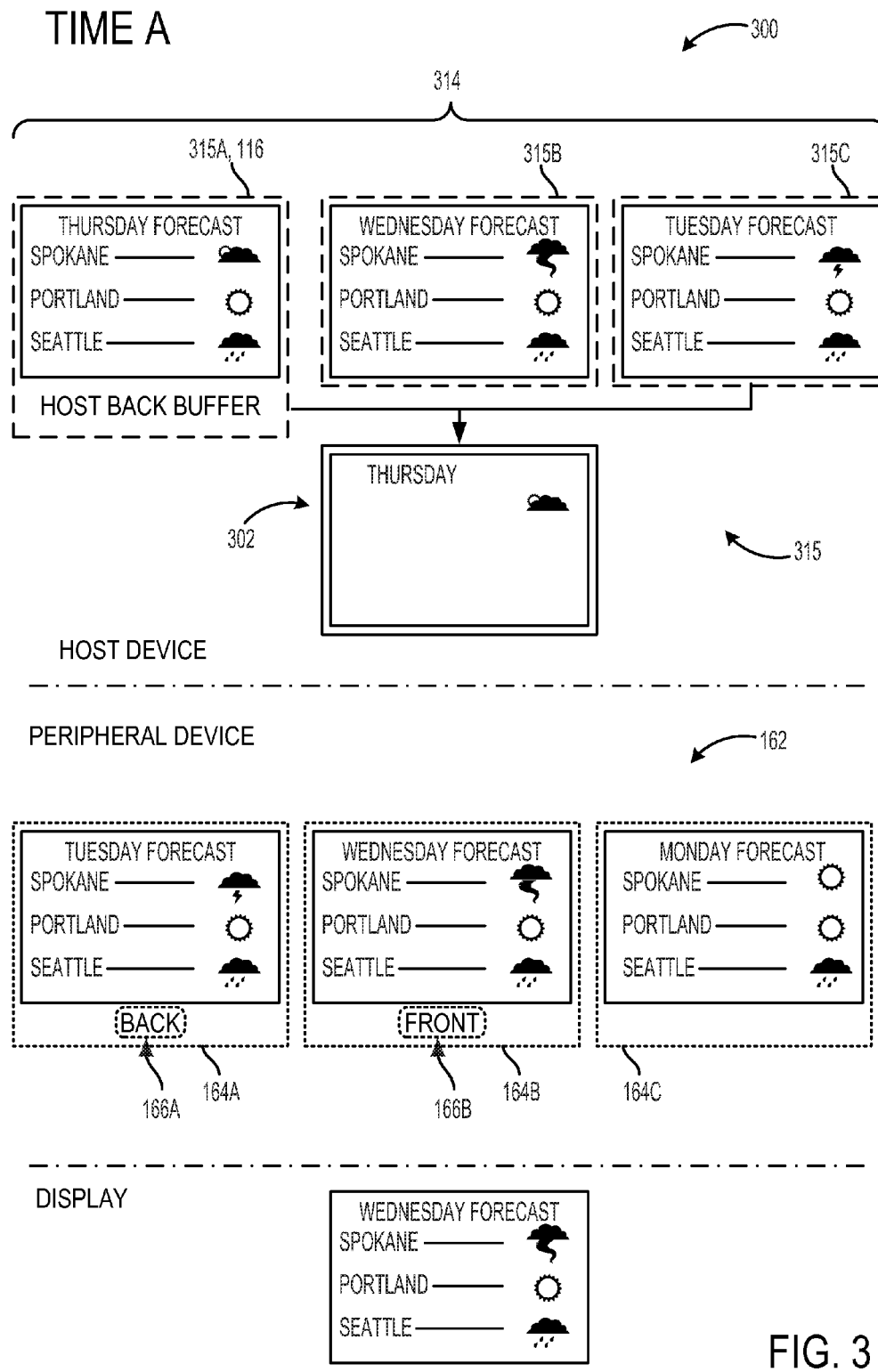
FIG. 3 is a schematic view of an operational state at an example image display system at a time (A) according to an embodiment of the method depicted in FIG. 2.

Method 200 comprises, at 202, generating N buffers in a host buffer chain. For example, FIG. 3 shows a schematic view of an operational state of an example image display system at a time (A) according to an embodiment of method 200. In the example shown in FIG. 3, where N=3, host buffer chain 314 includes three host buffers 315A, 315B, and 315C.

Continuing, method 200 comprises, at 204, rendering the current image into a host back buffer. In the example shown in FIG. 3, a day-by-day series of weather forecast images is shown for the cities of Spokane, Portland, and Seattle. As shown in FIG. 3, host buffer 315A acts as a host back buffer 116, into which a current image depicting THURSDAY FORECAST has been rendered. Host buffers 315B and 315C store previously rendered images, namely images depicting WEDNESDAY FORECAST and TUESDAY FORECAST, respectively.

Continuing, method 200 comprises, at 206, determining a difference between the current image and an (N−1)-th previously rendered image. In the example shown in FIG. 3, where N=3, determining a difference between the current image stored in host buffer 315A and the (N−1)-th previously rendered image stored in host buffer 315C comprises identifying a difference 302 between the THURSDAY FORECAST and TUESDAY FORECAST images.

In some embodiments, determining a difference between the current image and an (N−1)-th previously rendered image comprises determining all differences between the current image and the (N−1)-th previously rendered image. In the example shown in FIG. 3, difference 302 comprises all differences between the THURSDAY FORECAST and TUESDAY FORECAST images. Specifically, difference 302 comprises THURSDAY and a "mostly cloudy" graphic.

Figure 4:
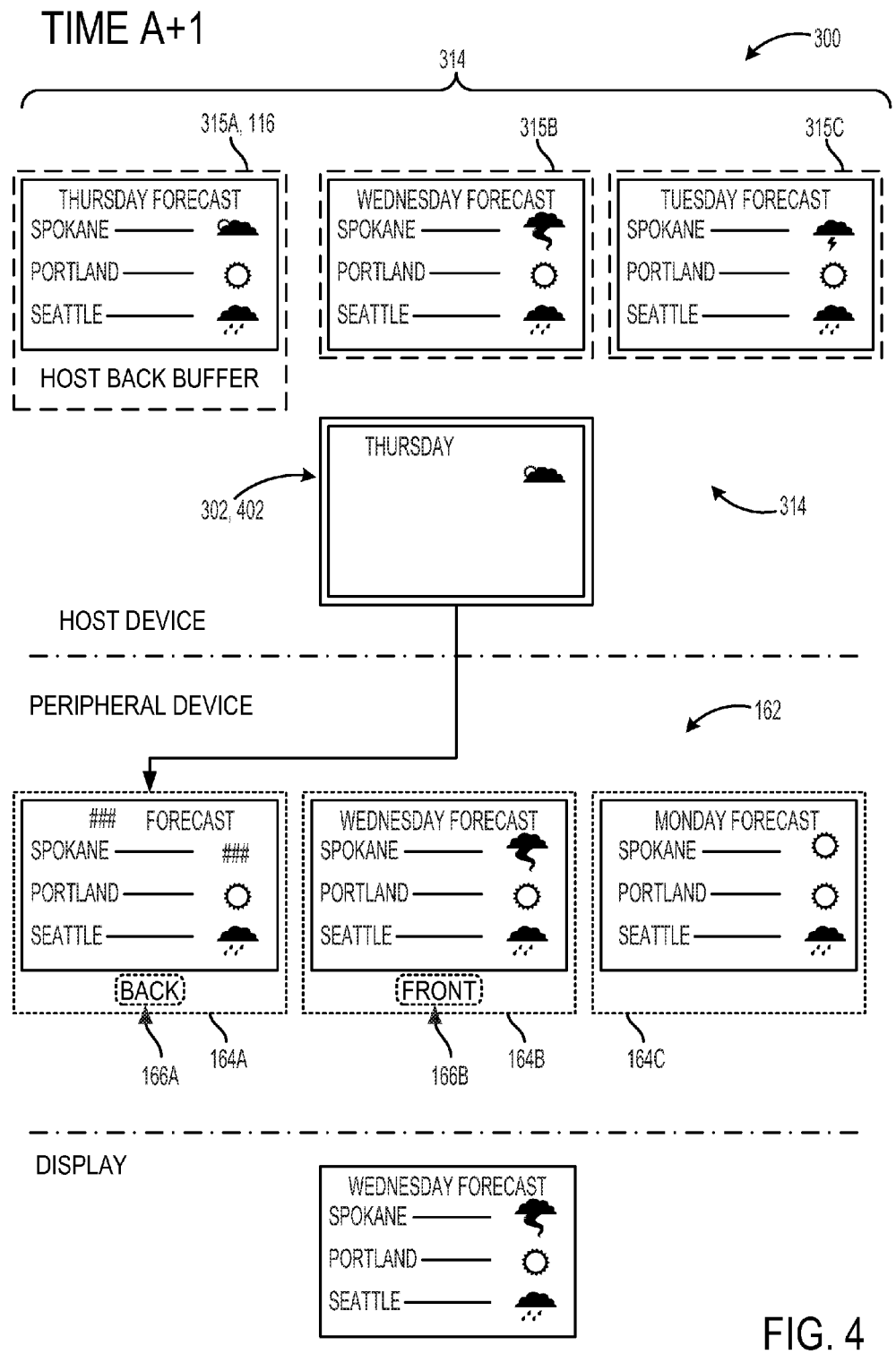
FIG. 4 is a schematic view of an operational state at the example image display system of FIG. 3 at a time (A+1) according to an embodiment of the method depicted in FIG. 2.

Continuing, method 200 comprises, at 208, outputting the frame of image data, including the difference. For example, FIG. 4 shows a schematic view of an operational state of the example image display system of FIG. 3 at a time (A+1), wherein a frame of image data 402, including difference 302, is shown being output to the peripheral device.

After outputting the frame of image data at 208, method 200 comprises, at 210, advancing the host image buffer chain. For example, FIGS. 4 and 5 show that host buffer chain 314 is advanced between times (A+1) and (A+2). Thus, the host image buffer chain is advanced each time that a frame of image data is output to the peripheral device. This allows the host computing device to track and to maintain parity with the content of the peripheral device buffer chain.

At 212, method 200 comprises writing the frame of image data to the peripheral device back buffer without forward copying. For example, in the embodiment shown in FIG. 4, frame of image data 402 is written to peripheral device buffer 164A, indicated as the peripheral device back buffer by buffer pointer 166A. Hash marks indicate the portion of the image stored in the peripheral device back buffer that is updated by frame of image data 402. In the example shown in FIG. 4, only those pixels comprising difference 302 are updated in the image stored in the peripheral device back buffer.

The image stored in peripheral device buffer 164A is also stored by host computing device 102, which stores the corresponding image in host buffer 114C. Because difference 302 represents the difference between the image stored in host buffer 114A and the image stored in 114C, only difference 302 is written to peripheral device buffer 164A to form the current image in the peripheral device back buffer. The remaining, un-updated portions of the image in peripheral device buffer 164A supply all of the pixels to complete the image. In the example shown in FIGS. 4 and 5, the previously displayed TUESDAY FORECAST image is updated by replacing TUESDAY with THURSDAY and by replacing a "thunderstorm" graphic with the "mostly cloudy" graphic. The unmodified elements of the image stored in peripheral device buffer 164A provide the remaining pixels. Thus, the peripheral device back buffer is not initialized with content from another peripheral device buffer via forward copying.

Continuing, method 200 comprises, at 214, advancing the buffer pointers of the peripheral device buffer chain. As shown in FIG. 5, back buffer pointer 166A and front buffer pointer 166B advance to point to peripheral device buffers 164C and 164A, respectively. Because the frame of image data received by the peripheral device is written to the peripheral device back buffer, the frame of image data comprising difference 502 will be written to peripheral device buffer 164C.

At 216, method 200 comprises displaying the content of the peripheral device front buffer. Because the frame of image data displayed by the peripheral device is pulled from the peripheral device front buffer, advancing the buffer pointers changes the displayed image. For example, in FIGS. 4-5, advancing the buffer pointers changes the displayed image from the image in peripheral device buffer 164B (WEDNESDAY FORECAST, as shown in FIG. 4) at time (A+1) to the image in peripheral device buffer 164A (THURSDAY FORECAST, as shown in FIG. 5) at time (A+2).

It will be appreciated that the embodiment described above is only one example of a method for generating and sending a frame of image data from a host computing device to a peripheral device for display at the peripheral device. Other embodiments may also provide a reduction in peripheral device computing overhead as well as potentially reducing image data storage size at the host computing device. For example, it may be expensive to store and compute differences for whole frames at the host computing device. Thus, in some embodiments, only the changed sections of the frame may be rendered into a host back buffer.

In some embodiments, the rendered section may be a change region or a "dirty" region. A change region may be defined by coordinates identifying a rectangular region or other suitably shaped region of a current image that is different from a previous image. However, it will be appreciated that other approaches to defining changed regions, such as changed rectangles and/or other changed polygons may be used within the scope of the present disclosure.

Storing coordinates for a changed region may take less space than storing a whole frame of image data. Similarly, it may be comparatively more efficient to calculate a difference between changed regions than to calculate a difference between whole frames. In such embodiments, the host image buffer chain described above may be replaced by a host image data storage chain comprising N lists of changed regions instead of N image buffers.

Figure 6:
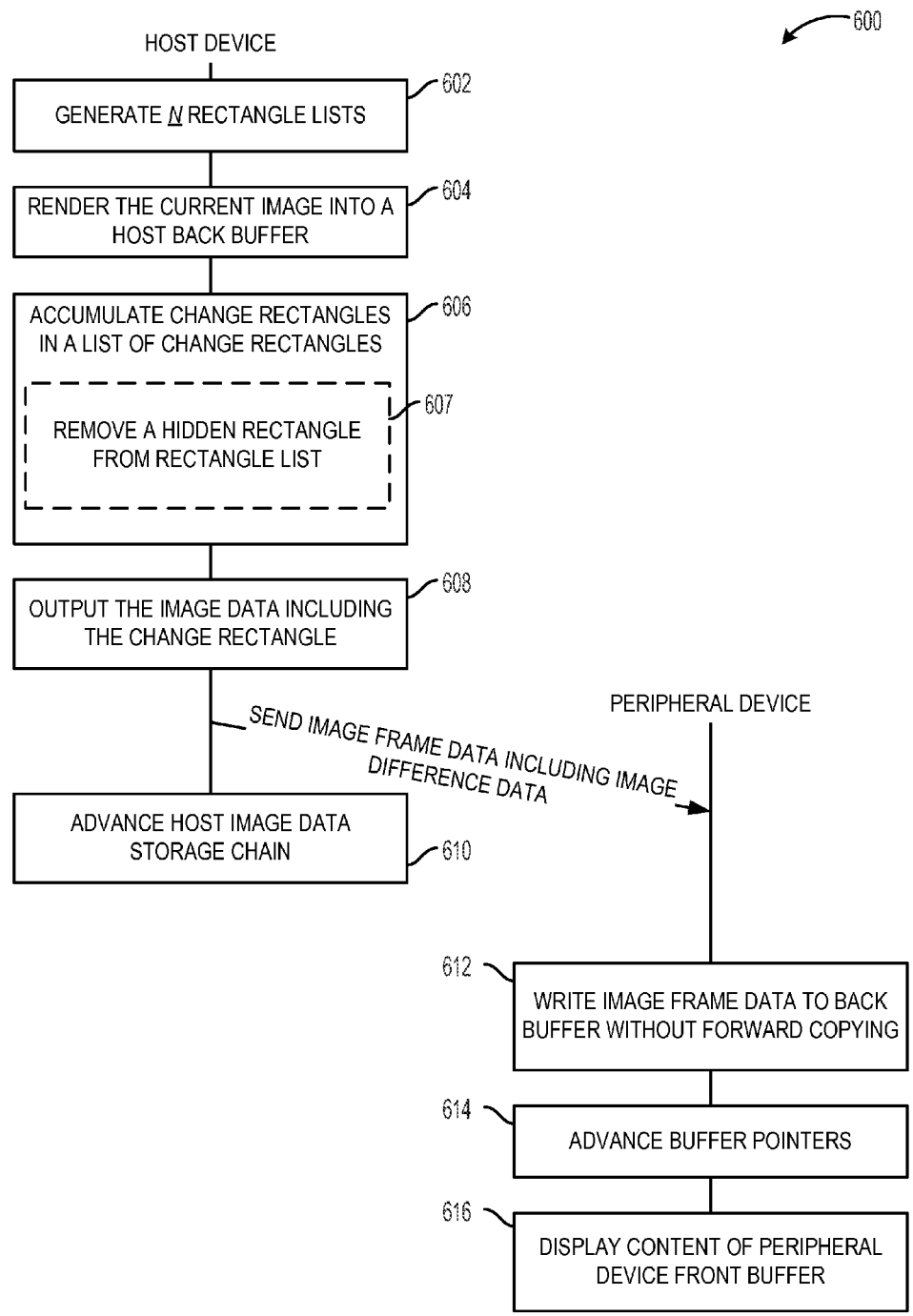
FIG. 6 is a flowchart depicting a method of sending image data from a host computing device to a peripheral device for display at the peripheral device according to another embodiment of the present disclosure.

For example, FIG. 6 illustrates a flowchart showing an embodiment of a method 600 for generating and sending a frame of image data from a host computing device to a peripheral device for display at the peripheral device. It will be appreciated that method 600 may be performed by any suitable image display system and is not limited to the embodiments described herein.

Figure 7:
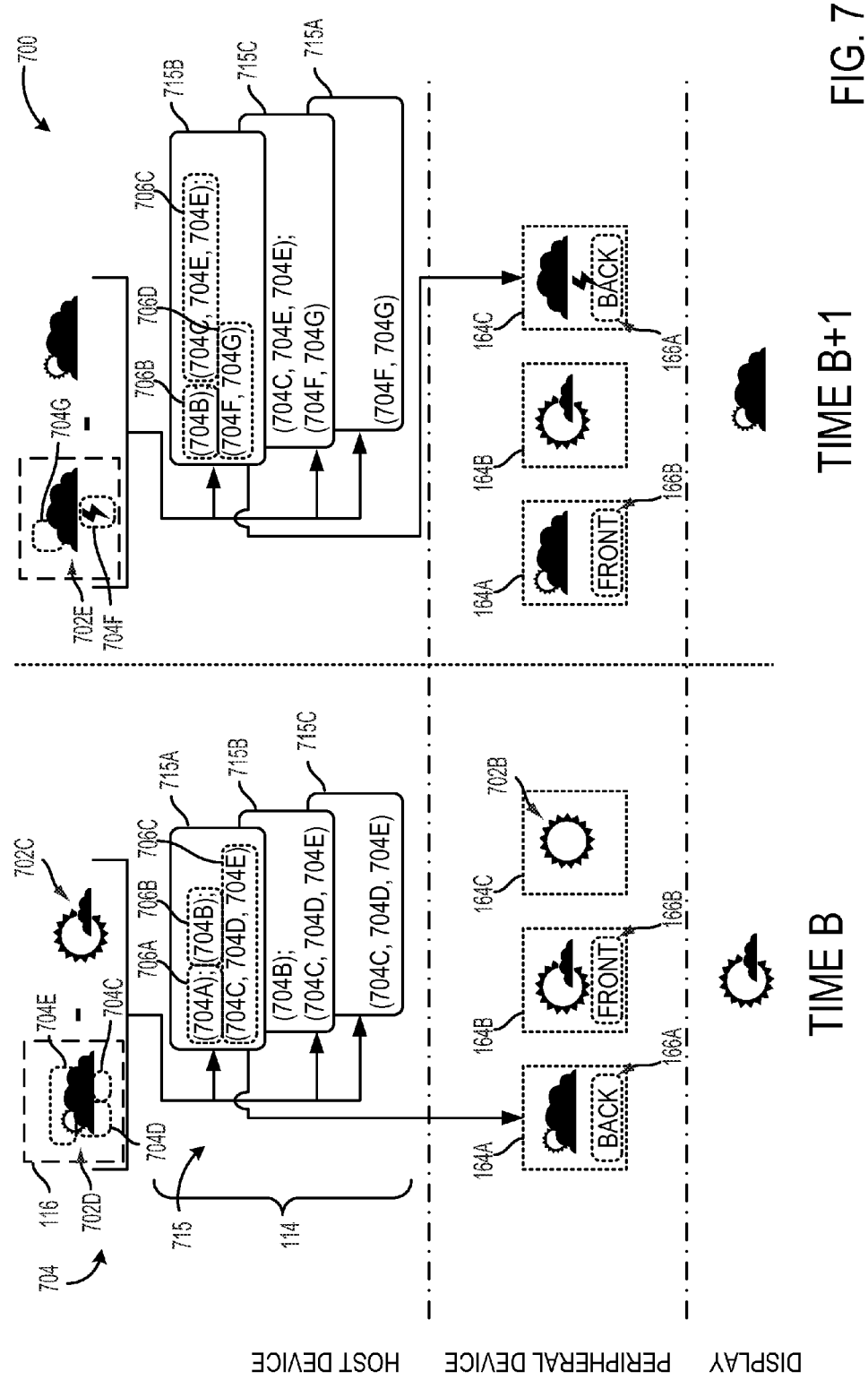
FIG. 7 is a schematic view of a time progression of an operational state at an example image display system according to an embodiment of the method depicted in FIG. 6.

Method 600 comprises, at 602, generating N changed region lists. For example, FIG. 7 shows a schematic view of a time progression 700 of an operational state at an example image display system according to method 600. In the example shown in FIG. 7, changed regions 704 are recorded in a host image data storage chain 114. In the example shown in FIG. 7, where N=3, three lists of changed regions 715A, 715B, and 715C are depicted. The N lists of changed regions comprise changed regions updated in the last N frames. In the embodiment shown in FIG. 7, lists of changed regions 715 comprise all of the changed regions updated in the last three frames, though it will be appreciated that, in some embodiments, not all changed regions may be recorded in the N lists of changed regions.

Continuing, method 600 comprises, at 604, rendering the current image into a host back buffer. For example, FIG. 7 shows images 702D and 702E being rendered into host back buffer 116 at time (B) and at time (B+1), respectively.

In some embodiments, the host computing device may include a single buffer. In some other embodiments, the host computing device may include a front buffer for outputting the frame of image data in addition to a single back buffer into which the image is rendered.

Continuing, method 600 comprises, at 606, accumulating changed regions for the previously rendered N frames in a list of changed regions. As shown in FIG. 7, changed regions 704C, 704D, and 704E are recorded in each list of changed regions 715A, 715B, and 715C at time (B), representing three rectangular regions in image 702D that differ from the corresponding regions in image 702C. List of changed regions 715A also includes changed region 704A, representing a previously determined difference between image 702A and 702B stored in list of changed regions 715A at time (B−2) (not shown) and changed region 704B, representing a difference between image 702B and 702C stored in list of changed regions 715A at time (B−1) (not shown). Accordingly, list of changed regions 715A comprises differences between the current image and the previous three images: difference 706A, comprising a difference between image 702A and image 702B; difference 706B, comprising a difference between image 702B and 702C; and difference 706C, comprising a difference between image 702C and current image 702D. Put another way, list of changed regions 715A comprises a difference between current image I, represented by image 702D, and an (I−N−1)-th previously rendered image, represented by image 702A. Accordingly, list of changed regions 715A comprises a difference between a currently rendered image and N previously rendered images.

It will be appreciated that a list of changed regions may comprise one or more overlapping regions. For example, FIG. 7 shows that changed region 704F may overlap a portion of changed region 704C. The portion of changed region 704C that is overlapped by changed region 704F will not be displayed on the peripheral device. Thus, the overlapped portion of changed region 704C forms a "hidden region."

Accordingly, in some embodiments, recording a changed region at 606 may comprise, at 607, removing a hidden region from the region list. Removing hidden region may save transmission bandwidth in the data channel. Further, because the hidden region may be written and then rewritten at the peripheral device during the image update, removing the hidden region may save peripheral device writing time.

Some approaches for removing a hidden region include removing earlier-rendered regions that are completely overlapped by subsequently rendered change regions from the list of change regions. Other approaches for removing hidden regions include subdividing earlier-rendered change regions that are partially overlapped by subsequently rendered change regions into a plurality of subregions, some of which are completely overlapped and some of which are not overlapped. The list of change regions is then edited so that completely overlapped subregions are removed from the list of change regions and non-overlapped subregions remain. It will be appreciated that such subdivisions may be repeated, generating smaller subregions. In some embodiments, the smallest subregion may comprise a single pixel. Alternatively, in some embodiments, the smallest subregion may be configured to comprise a plurality of pixels. Accordingly, it will be appreciated that any suitable method of removing a hidden region may be employed without departing from the scope of the present disclosure.

Continuing, method 600 comprises, at 608, outputting the frame of image data, wherein the frame of image data comprises changed regions for at least N previously rendered images. As shown in FIG. 7, at time (B), list of change regions 715A includes change regions 704C, 704D, and 704E, as discussed above.

Continuing, method 600 comprises, at 610, advancing the host image data storage chain. For example, FIG. 7 shows that host image data storage chain 114 is advanced between time (B) and time (B+1). Thus, the host image data storage chain is advanced each time that a frame of image data is output to the peripheral device, allowing the host computing device to track and maintain parity with the content of the peripheral device buffer chain.

At 612, method 600 comprises writing the frame of image data to a peripheral device back buffer without forward copying. Thus, the image formed at the peripheral device back buffer comprises only the existing content of the peripheral device back buffer and the list of change regions included in the frame of image data. In the embodiment shown in FIG. 7, at time (B), the existing content of peripheral device buffer 164A, indicated as the peripheral device back buffer by buffer pointer 166A, is updated by list of change regions 715A.

Because the list of change regions received with the frame of image data includes change regions for the last N frames, and because the peripheral device includes N image buffers arranged in a closed loop, the list of change regions simulates the peripheral device image buffers at the host computing device. Accordingly, the frame of image data includes all of the image data to update an existing image stored in the peripheral device back buffer. Thus, the peripheral device back buffer is not initialized with content from another peripheral device buffer via forward copying.

Continuing, method 600 comprises, at 614, advancing the buffer pointers. For example, in FIG. 7, back buffer pointer 166A and front buffer pointer 166B advance to point at peripheral device buffers 164C and 164A, respectively. Because the frame of image data received by the peripheral device is written to the peripheral device back buffer, the frame of image data comprising list of change regions 715B will be written to peripheral device buffer 164C at time (B+1).

At 616, method 600 comprises displaying the content of the peripheral image device front buffer. Because the frame of image data displayed by the peripheral device is pulled from the peripheral device front buffer, advancing the buffer pointers changes the displayed image. For example, in FIG. 7, advancing the buffer pointers causes the display to change from the image in peripheral device buffer 164B (a "mostly sunny" graphic) at time (B) to the image in peripheral device buffer 164A (a "mostly cloudy" graphic) at time (B+1).

While storing a change region may take less space than storing a whole frame of image data, it will be appreciated that other embodiments may provide still greater computational efficiency in scenarios where several hidden regions are generated in a frame sequence. For example, it may be easier to accumulate a list of changed tiles or "dirty" tiles than to generate, accumulate, and filter a list of change regions.

As used herein, a changed tile represents an address for a predefined portion of a rendered image that is changed relative to the corresponding portion of a previously rendered image. For example, a tiling grid comprising square tiles and having a predefined pitch may be applied to an image to define tile addresses for each tile location within the image. Tiles identified as being different between successive frames are identified as changed tiles. When a changed tile is received by the peripheral device, the peripheral device updates the image data at the tile address for the corresponding changed tile. In some embodiments, a changed tile may represent a tile address in a single bit. Thus, the frame of image data sent to the peripheral device may be smaller than frames of image data including grids of pixel data or change region coordinates.

It will be appreciated that any suitable collection of tiles may be employed according to the present disclosure. For example, in some embodiments, the tiles may be plane figure tiles configured to fill the image without overlaps or gaps. In some other embodiments, the tiles may be configured to overlap one another by a predefined amount. In the example presented above, the predefined pitch defines the tile size. Changing the tile size changes the resolution at which changed tiles are identified. In some embodiments, the smallest resolution may represent a single pixel. Alternatively, in some other embodiments, the smallest resolution may be configured to include a plurality of pixels.

Figure 8:
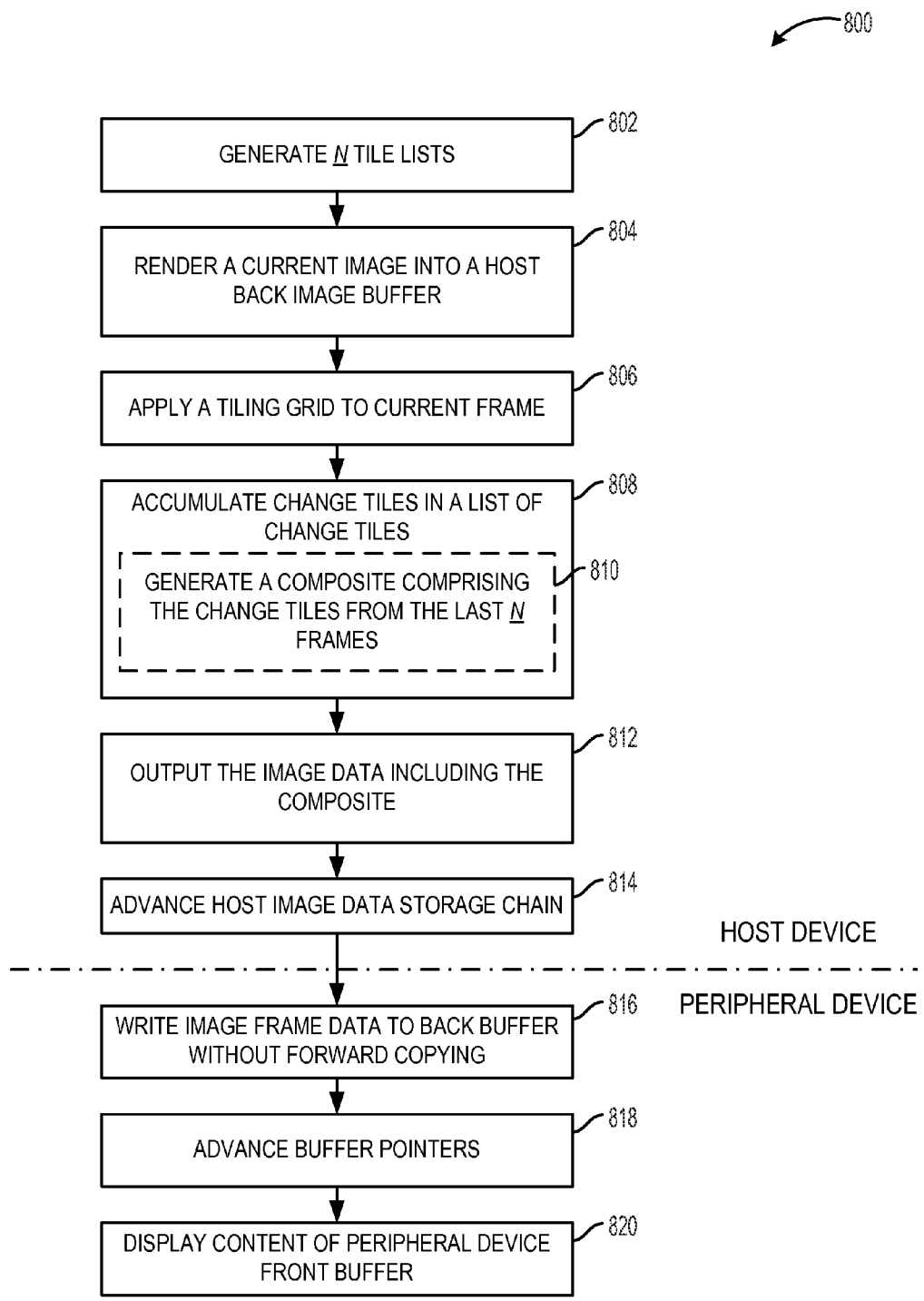
FIG. 8 is a flowchart depicting a method of sending image data from a host computing device to a peripheral device for display at the peripheral device according to another embodiment of the present disclosure.

For example, FIG. 8 illustrates a flowchart showing an embodiment of a method 800 for generating and sending a frame of image data from a host computing device to a peripheral device for display at the peripheral device. It will be appreciated that method 800 may be performed by any suitable image display system and is not limited to the embodiments described herein.

Method 800 comprises, at 802, generating N lists of changed tiles. The N lists of changed tiles comprise changed tiles updated in the last N frames. For example, FIG. 9 shows a schematic view of a time progression 900 of an operational state at an example image display system according to method 800.

Figure 9:
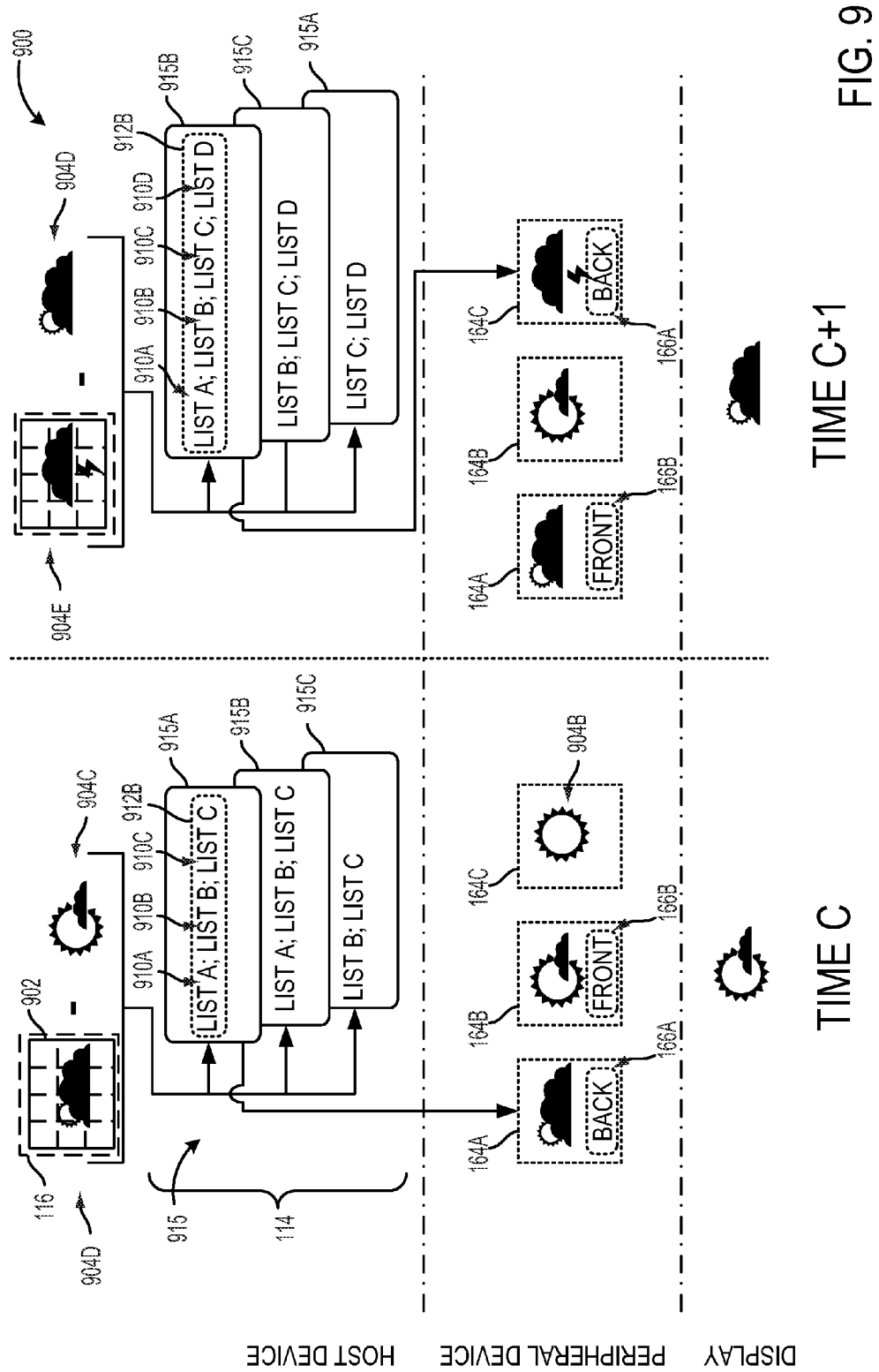
FIG. 9 is a schematic view of a time progression of an operational state at an example image display system according to an embodiment of the method depicted in FIG. 8.

In the example shown in FIG. 9, where N=3, three lists of changed tiles 915A, 915B, and 915C are included in host image data storage chain 114. Lists of changed tiles 915 comprise all changed tiles updated in the last three frames, though it will be appreciated that, in some embodiments, not all changed tiles may be recorded in the N lists of changed tiles.

Continuing, method 800 comprises, at 804, rendering the current image into a host back buffer. In some embodiments, the host computing device may include a single buffer. In some other embodiments, the host computing device may include a front buffer for outputting the frame of image data in addition to a single back buffer into which the image is rendered. For example, FIG. 9 shows images 904D and 904E being rendered into host back buffer 116 at time (C) and at time (C+1), respectively.

Continuing, method 800 comprises, at 806, applying a tiling grid to the current frame. For example, FIG. 9 shows a tiling grid 902 applied to image 904D at time (C) and to image 904E at time (C+1).

FIG. 10 shows a more detailed application of tiling grid 902 to images 904 of FIG. 9. Specifically, FIG. 10 shows tiling grid 902 applied to four successive frames: current frame I, comprising image 904E, and three previously rendered frames I-1, I-2, and I-3, comprising images 904D, 904C, and 904B, respectively.

Changed tiles are identified and distinguished from unchanged tiles by comparing successive images. The identified changed tiles comprising a difference between two successive images are stored in a frame tiling. In some embodiments, a frame tiling comprises all changed tiles between two successive images. For example, in FIG. 10, four changed tiles 908 are identified by comparing image 904A with a previously rendered image (not shown) and are stored in frame tiling 910A; two changed tiles 908 are identified by comparing images 904B and 904C and are stored in frame tiling 910B; eight changed tiles 908 are identified by comparing images 904C and 904D and are stored in frame tiling 910C; and six changed tiles 908 are identified by comparing images 904D and 904E and are stored in frame tiling 910D.

Continuing, method 800 comprises, at 808, accumulating changed tiles for the previously rendered N frames in a list of changed tiles. A list of changed tiles aggregates the frame tilings identified for successive images. For example, FIG. 9 shows three lists of changed tiles 915 included in host image data storage chain 114. Each list of changed tiles 915 includes one or more frame tilings 910. As shown in FIG. 9, frame tilings 910A, 910B, and 910C are stored in list of changed tiles 915A at time C.

In some embodiments, accumulating changed tiles in a list of changed tiles comprises, at 810, generating a composite comprising the changed tiles from the last N frames. In the example shown in FIG. 10, where N=3, changed tiles 908 for current image 904E and for the three previously rendered images 904B, 904C, and 904D are accumulated in composite 912B. Thus, composite 912B comprises a difference between current frame I, represented by image 904E, and an (I-N-1)-th previously rendered image, represented by image 904B. Accordingly, composite 912B includes a difference between a currently rendered image and N previously rendered images.

In some embodiments, composite 912 is generated by combining frame tilings 910. Because the changed tile includes a tile address, duplication of a changed tile during generation of composite 912 adds no new information and obscures no existing information. When the frame of image data is output to the peripheral device, the changed tile indicates locations where image data is to be updated by the peripheral device. Thus, generating composite 912 may avoid the transmission of redundant information via hidden regions or tiles.

Continuing, method 800 comprises, at 812, outputting the frame of image data, wherein the frame of image data comprises image data for the changed tiles for N previously rendered images. As shown in FIG. 9, at time (C), list of changed tiles 915A, including frame tilings 910A, 910B, and 910C, and representing an accumulation of changed tiles between image 904D and the N previously rendered images, is output to the peripheral device back buffer.

Continuing, method 800 comprises, at 814, advancing the host image data storage chain. For example, FIG. 9 shows that host image data storage chain 114 is advanced between time (C) and time (C+1). Thus, the host image data storage chain is advanced each time that a frame of image data is output to the peripheral device, allowing the host computing device to track the content of the peripheral device storage chain.

At 816, method 800 comprises writing the frame of image data to a peripheral device back buffer without forward copying. Thus, an image is formed at the peripheral device back buffer comprising the content of the peripheral device back buffer and the difference included in the frame of image data. In the embodiment shown in FIG. 9, at time (C), the existing content of peripheral device buffer 164A, indicated as the peripheral device back buffer by buffer pointer 166A, is updated by list of changed tiles 915A.

Because the list of changed tiles received with the frame of image data includes changed tiles for the last N frames, and because the peripheral device includes N image buffers arranged in a closed loop, the list of changed tiles simulates the peripheral device image buffers at the host computing device. Accordingly, the frame of image data includes the image data to update an existing image stored in the peripheral device back buffer. Thus, the peripheral device back buffer is not initialized with content from another peripheral device buffer via forward copying.

Continuing, method 800 comprises, at 818, advancing the buffer pointers. For example, in FIG. 9, back buffer pointer 166A and front buffer pointer 166B advance to point at peripheral device buffers 164C and 164A, respectively. Because the frame of image data received by the peripheral device is written to the peripheral device back buffer, the frame of image data comprising difference list of changed tiles 915B will be written to peripheral device buffer 164C at time (C+1).

At 820, method 800 comprises displaying the content of the peripheral image device front buffer. Because the frame of image data displayed by the peripheral device is pulled from the peripheral device front buffer, advancing the buffer pointers changes the displayed image. For example, in FIG. 9, advancing the buffer pointers causes the display to change from the image in peripheral device buffer 164B (a "mostly sunny" graphic) at time (C) to the image in peripheral device buffer 164A (a "mostly cloudy" graphic) at time (C+1).

In some embodiments, the above described methods and processes may be tied to a computing system including one or more computing devices. These computing devices typically include a processor and associated volatile and non-volatile memory, as well as mass storage device such as a hard drive. These computing devices may be connected via computer networks, such as the Internet. The methods and processes described herein may be implemented as a computer application, computer service, computer API, computer library, and/or other computer program product. It is to be appreciated that a "service", as used herein, may be an application program executable across multiple user sessions and available to one or more system components, programs, and/or other services. In some implementations, a service may run on a server responsive to a request from a client.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A peripheral device, comprising:
  a display;
  a logic subsystem; and
  a data storage subsystem storing instructions executable by the logic subsystem to display images sent from a host computing device to the peripheral device by:
    receiving difference image data comprising a difference between a current frame of image data and an (N−1)-th previously received frame of image data, N being an integer and having a value of 3 or more;
    forming a display image by updating a stored image held in a peripheral device image buffer chain with the difference image data, the peripheral device image buffer chain comprising N image buffers; and
    displaying the display image via the display.

2. The peripheral device of claim 1, wherein the difference image data comprises all differences between the current frame of image data and the (N−1)-th previously received frame of image data.

3. The peripheral device of claim 1, wherein the difference image data comprises changed regions for at least N previously received frames of image data.

4. The peripheral device of claim 3, wherein each changed region comprises a rectangular shape.

5. The peripheral device of claim 1, wherein the instructions are executable to store the stored image in a back buffer of the peripheral device image buffer chain.

6. The peripheral device of claim 5, wherein the instructions are further executable to advance a front buffer pointer and a back buffer pointer of the peripheral device buffer chain after forming the display image.

7. The peripheral device of claim 1, wherein the instructions are executable to form the display image by updating the stored image without forward copying of a frame of image data.

8. On a peripheral device, a method of displaying images sent from a host computing device to the peripheral device for display on a display of the peripheral device, the peripheral device including a peripheral device image buffer chain comprising N image buffers, the method comprising:
  receiving first difference image data comprising a difference between a first current frame of image data and an (N−1)-th previously received frame of image data, N being an integer and having a value of 3 or more;
  forming a first display image by updating a stored image held in a back buffer of the peripheral device image buffer chain with the first difference image data, the peripheral device image buffer chain comprising N image buffers including the back buffer and a front buffer;
  advancing a front buffer pointer and a back buffer pointer such that a buffer location that was previously the back buffer becomes the front buffer;
  displaying the first display image;
  after receiving the first difference image data, receiving second difference image data comprising a difference between a second current frame of image data and an (N−1)-th previously received frame of image data;
  forming a second display image by updating a stored image held in the back buffer of the peripheral device image buffer chain with the second difference image data;
  advancing the front buffer pointer and the back buffer pointer; and
  displaying the second display image.

9. The method of claim 8, wherein the first difference image data comprises all differences between the first current frame of image data and the (N−1)-th previously received frame of image data.

10. The method of claim 8, wherein the first difference image data comprises changed regions for at least N previously received frames of image data.

11. The method of claim 10, wherein each changed region comprises a rectangular shape.

12. The method of claim 8, further comprising forming the display image by updating the stored image without forward copying of a frame of image data.

13. A host computing device for rendering and sending image data to a peripheral device for display, the host computing device comprising:
  a data storage subsystem;
  a logic subsystem; and instructions stored in the data storage subsystem and executable by the logic subsystem to:
determine a difference between a currently rendered image and an (N−1)-th previously rendered image, N being an integer and having a value of 3 or more, and
output the difference as a frame of image data to the peripheral device.

14. The host computing device of claim 13, wherein the frame of image data comprises all differences between the currently rendered image and the (N−1)-th previously rendered image.

15. The host computing device of claim 13, further comprising instructions to:
generate a host buffer chain comprising N buffers;
store the currently rendered image in a host back buffer of the host buffer chain; and
advance the host buffer chain after outputting the frame of image data to the peripheral device.

16. The host computing device of claim 15, wherein the host buffer chain is configured to simulate a peripheral buffer chain of the peripheral device.

17. The host computing device of claim 13, further comprising instructions executable to:
generate a region list chain, wherein the region list chain comprises N region lists;
accumulate changed regions in the region list chain, wherein each changed region comprises a difference between successive image frames;
include the changed regions for a previous N frames in the frame of image data output to the peripheral device; and
advance the region list chain.

18. The host computing device of claim 17, further comprising instructions to remove a hidden region from a number of the region lists.

19. The host computing device of claim 13, further comprising instructions to:
generate a tile list chain, wherein the tile list chain comprises N tile lists;
accumulate changed tiles in the tile list chain, wherein each changed tile comprises a difference between successive image frames;
include the changed tiles for a previous N frames in the frame of image data output to the peripheral device; and
advancing the tile list chain.

20. The host computing device of claim 19, wherein the instructions to accumulate changed tiles in the tile list chain further comprises instructions to generate a composite comprising the changed tiles from the previous N frames.

* * * * *